Patented Mar. 2, 1954

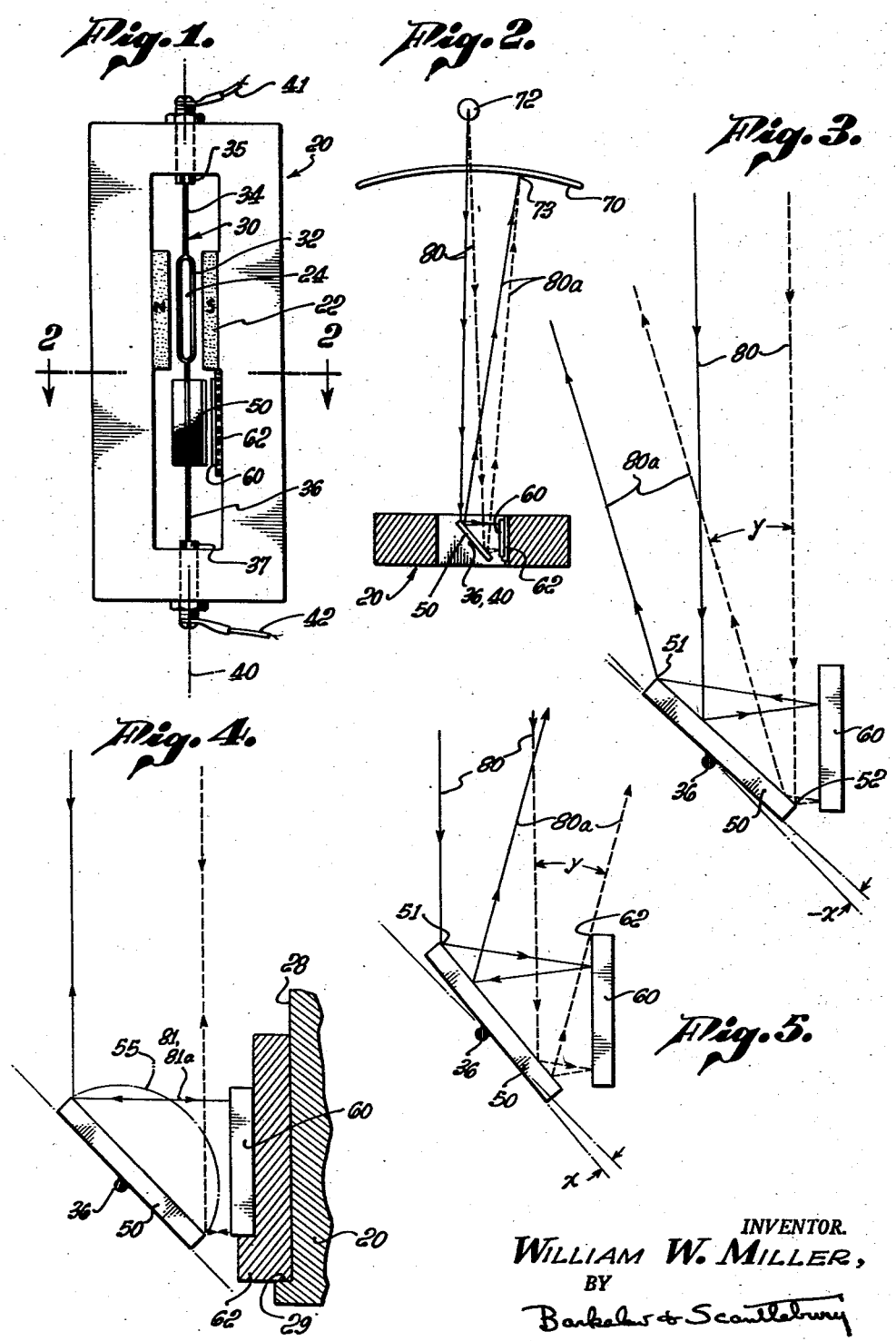

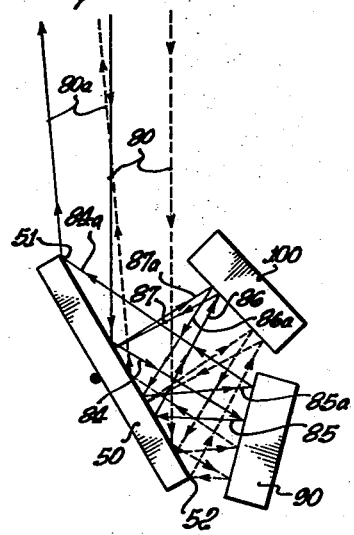

2,670,660

UNITED STATES PATENT OFFICE 2,670,660

MULTIPLE REFLECTION INDICATION FOR MOVING MIRROR INSTRUMENTS

William W. Miller, Los Angeles, Calif., assignor, by mesne assignments, to William Miller Instruments, Inc., a corporation of California Application June 19, 1951, Serial No. 232,383

3 Claims. (Cl. 88—74)

This invention has to do with optical systems for indicating or recording small rotational movements of movable elements of measuring instruments. Typical of such elements are the coil or magnet suspensions of sensitive electrical instruments, for example galvanometers, and the movable elements of accelerometers.

It is well known to mount a small mirror in fixed relation to the movable element of such an instrument and to observe the deflections of a light beam reflected from the mirror. The effect of mirror rotation in such a system can be amplified in a certain sense by increasing the distance from the mirror at which the reflected beam is observed. That type of amplification, however, is limited in practice by the space requirements of a long "optical lever"; and is more fundamentally limited by the fact that, for a movable mirror of specified size, the relative aperture of the optical beam decreases with increasing "lever arm," ultimately reducing the definition of the observed or recorded image by the same factor by which the image movement is increased. Furthermore, as the effective lever arm is increased the focal distance to the moving image increases also, giving an image that is physically larger in the direction of movement. Hence, for a light source of given dimensions there is no gain in effective sensitivity.

An important object of the present invention is to provide increased amplification of such mirror rotation without the disadvantages inherent in a very long optical path. Such amplification is obtained, in accordance with the invention, by very simple and economical means, without the addition of any moving parts and without requiring any unusual critical adjustments. Moreover, the increase in amplification that is produced by the invention, that is, the increase in effective sensitivity of the instrument, is inherently linear, and is expressible as an amplification factor that is substantially equal to an integer. That integer may be given any value from two up to five or more.

In accordance with the invention, one or more auxiliary mirrors are fixedly mounted on the frame of the instrument spacedly opposing the movable mirror and in such position that the optical indicating beam is reflected from the movable mirror not only once, but repeatedly. Any rotational displacement of the movable mirror from its equilibrium position produces a two-fold angular deviation of the optical beam at each such reflection, the effect being cumulative for the entire series of successive reflections. By suitable location of the auxiliary mirror or mirrors, and by suitable choice of the zero or equilibrium orientation of the movable mirror, any desired number of beam reflections from the movable mirror, from two up to five or more, may be obtained, with corresponding amplification of the final beam deflection as compared with previous practice of utilizing only a single reflection.

A full understanding of the invention, together with its further objects and advantages, will be obtained from the following description of certain typical and representative manners of carrying it out. That description, and the accompanying drawings which form a part thereof, are intended only as illustrations and are not to be interpreted as limiting the scope of the invention.

In the drawings:

Fig. 1 is an elevation, partly schematic, of one illustrative form of the invention embodied in a galvanometer;

Fig. 2 is a horizontal section at reduced scale, taken on line 2—2 of Fig. 1 and showing additional portions of the illustrative system schematically in plan;

Figs. 3–5 correspond to a portion of Fig. 2 at enlarged scale, and represent three typical positions of the instrument;

Figs. 6–8 correspond to Figs. 3–5, but show another embodiment of the invention; and Figs. 9 and 10 correspond to Fig. 7, but show alternative conditions of adjustment.

Referring first particularly to Fig. 1, the numeral 20 represents generally a portion of the fixed frame of a measuring instrument having a rotationally movable element, represented generally at 30. Frame 20 may, for example, include a fixed magnet having spaced pole pieces 22 which produce a magnetic field in the air gap 24; and element 30 may comprise a galvanometer suspension with an elongated electrical coil 32 rotatably suspended in the gap 24 by means of suspension fibers 34 and 36, which also provide electrical connection to the coil for the current to be measured. Suitable insulated supports for fibers 34 and 36 on frame 20 are indicated partially schematically at 35 and 37, respectively, at least support 35 preferably being rotationally adjustable with respect to frame 20 about the longitudinal axis of rotation of the suspension, indicated at 40. Electrical connections via the suspending fibers to coil 32 are indicated schematically at 41 and 42. The axis of rotation of suspension 30 will be considered vertical for convenience of representation and description, but without intending any limitation upon the actual orientation of that axis or of related parts of the system. The construction and relative arrangement of the magnet and the suspension are shown only schematically, and are intended to be broadly representative of instruments having rotatable elements.

A mirror is shown at 50, mounted on suspension 30 in fixed relation to coil 32 and adapted to rotate with that coil about axis 40 in response to current in the coil. Mirror 50 is preferably coated on its front surface, and may be cylindrically or spherically concave so that light incident upon it is brought to a focus at a light receiving surface. An auxiliary mirror, in accordance with the present invention, is shown typically at 60, mounted fixedly on frame 20. Mirror 60 may, for example, be cemented directly against a suitable flat surface of the frame, or may be secured to a bracket which is in turn mounted on the frame. Such a bracket, shown illustratively at 62, provides a convenient means of obtaining the desired clearance between mirror 60 and movable mirror 50, and the desired mirror angle.

Fig. 2 represents in schematic horizontal section an illustrative optical arrangement for indicating or recording on a surface 70 rotational movement of a galvanometer suspension 30. The surface 70 may represent, for example, a light sensitive recording medium such as photographic film or paper, which may be moved uniformly in a direction normal to the plane of Fig. 2. Or surface 70 may represent means for visual observation, such as a stationary graduated scale. The numeral 72 represents means for defining a light beam incident upon movable mirror 50. In the embodiment illustrated, beam defining means 72 represents a light source, such as a narrow ribbon filament lamp or any functionally equivalent line or point source. Light source 72 projects a beam of light 80 upon movable mirror 50, in a light beam plane defined by suspension axis 40 and the axis of the light beam. As seen in Fig. 2, axis 40 substantially coincides with suspension fiber 36, shown in section. Light beam 80 is not reflected directly from mirror 50 to surface 70, as in previous practice, but is reflected first to auxiliary mirror 60, the equilibrium rotational position of movable mirror 50 being adjusted to a suitably oblique angle for that purpose. The light beam is reflected from auxiliary mirror 60 back to movable mirror 50, and then, only after reflection for a second time from mirror 50, is directed as indicated typically at 80a to surface 70.

Incident and reflected beams 80 and 80a are ordinarily slightly oblique with respect to a plane normal to suspension axis 40, so that light receiving surface 70, whatever its nature, does not interfere with incident beam 80. Optical means of any suitable type are provided to produce at surface 70 an image of source 72, as indicated at 73 in Fig. 2. Preferred means for such focusing of the beams will be described.

The beam defining means shown schematically at 72 may in practice be a telescope or its equivalent, directed toward mirror 50 and focused upon surface 70 as seen by light reflected mirrors 50 and 60. With such an arrangement light actually passes from surface 70 to beam defining means 72, rather than in the opposite direction. However, the beam may still be considered to be defined by means 72, whether a light projecting source or the equivalent of a light receiving telescope is employed.

Figs. 3-5 show at enlarged scale the two mirrors of Fig. 2 and limiting rays of the incident and reflected beams for three representative positions of movable mirror 50. The light beams are illustratively shown as plane parallel beams. If either or both of mirrors 50 and 60 are curved in the plane of the figures, or if other beam focusing means are provided, the positions of those rays will be changed in detail but not in principle. The equilibrium position of suspension 30 is preferably so adjusted, as by rotating mounting 35 bodily in frame 20 (Fig. 1), that, for some definite condition of the instrument, the light beam 80 is reflected by mirror 50 along 81 in such a direction as to be incident normally (as seen in plan) upon fixed mirror 60, as illustrated in Fig. 4. Such normal incidence upon mirror 60 causes each light ray to retrace its path (at least as seen in plan), so that each ray path drawn in Fig. 4 represents both an incident ray 80 or 81 and a corresponding reflected ray 80a or 81a, as indicated by the arrows.

Particularly if deflections of the suspension on both sides of equilibrium are of interest, Fig. 4 may represent the equilibrium position itself, corresponding, for example, to zero current if the instrument is a direct current galvanometer. Currents of opposite polarity will then produce opposite rotations of the suspension, bringing it to positions typically shown in Figs. 3 and 5, in which the finally reflected light beam 80a is deviated in opposite directions through angles indicated as $-y$ and $y$, respectively. For any given angular deflections of mirror 50, indicated as $-x$ and $x$ in Figs. 3 and 5, respectively, it will be noted that $$y=4x$$

That is, the angular deviation of the reflected beam for a given mirror deflection in either direction is twice what it would be for a single direct reflection from the mirror.

Alternatively, and particularly if deflections of the suspension in only one direction from equilibrium are of interest, the equilibrium position of the suspension (corresponding, for example, to zero current for a galvanometer) may be set close to one end of the useful range of mirror positions as illustrated typically in Fig. 3. The entire deflection from that position, through the intermediate position of Fig. 4, to the opposite limit of the useful range (such as Fig. 5) is then available for indicating or recording currents (for example) of one polarity. For purposes of the present description, the "zero position" of the suspension refers to that intermediate position for which the finally reflected beam retraces the path (as seen in plan) of the incident beam, as in Fig. 4, regardless of whether that position corresponds to zero value of the quantity being measured.

The limits of the useful deflection range may be set in practice by physical dimensions of the apparatus (for example, by the length of surface 70 in Fig. 2), or simply by the degree of mirror rotation that is feasible without excessive vignetting of the light beam. Such vignetting is slight in Figs. 3 and 5, but is illustrated in principle. The useful width of incident beam 80 is limited on the left in Fig. 5 and on the right in Fig. 3 only by direct action of the corresponding edges 51 and 52 of mirror 50; but is limited on the right in Fig. 5 by interference of the reflected beam with the edge 62 of mirror 60, and on the left in Fig. 3 by the limiting action of edge 51 of mirror 50 upon the reflected, rather than upon the incident beam.

It is pointed out, with respect to the preferred position of mirror 60 in Figs. 3-5, that the reflective face of the mirror is parallel to initial incident beam 80; and that the body of the mirror is spaced from movable mirror 50 only enough to provide safe clearance for the latter to rotate freely, the path of its forward edges during such rotation being indicated by the line 55 in Fig. 4. The transverse dimension of mirror 60 need extend, as seen in plan, only far enough to include the normal projection upon it of the face of mirror 50 when the latter is in the zero position of Fig. 4 (that projection is well represented, for example, by the indicated limits of the light beam where it strikes mirror 60 in Fig. 4). Although rotation of mirror 50 toward the position of Fig. 5 increases the width of its projection upon mirror 60, the useful part of the light beam incident upon the fixed mirror remains always within the stated limits. An advantage of the detailed preferred arrangement just described is that vignetting is held to a low value even for fairly large angular deflections, and is approximately equal for deflections on both sides of the zero position (Fig. 4).

Another illustrative embodiment of the invention is illustrated in Figs. 6-8, which show three representative rotational positions of movable mirror 50. In that embodiment two fixed reflective surfaces are provided, shown as separate mirrors 90 and 100, supported in definitely predetermined positions with respect to the suspension by means of a bracket indicated typically at 110. The zero position of movable mirror 50 in that embodiment is that shown in Fig. 7, for which the initially incident light beam 80 and the finally reflected light beam 80a coincide, as seen in plan. As before, the incident and reflected beams are preferably slightly oblique in the plane through the suspension axis 40. For that zero mirror position, each ray of the incident beam coincides (in plan) throughout its various reflections with a corresponding ray of the reflected beam, as indicated by the double arrows in Fig. 7. (The slight effect of possible mirror curvature is omitted in the figures for clarity of illustration.) Throughout its path through the system the beam is reflected alternately by the movable and by a fixed mirror, the first and last reflections being at movable mirror 50. The incident beam proceeds, after its first reflection by mirror 50, along path 84 to mirror 90, along 85 to mirror 50, along 86 to mirror 100, and along 87 to mirror 50. Since beam 87 strikes mirror 50 normally (as seen in plan) it is returned directly upon itself. The reflected beam therefore follows the paths successively shown at 87a, 86a, 85a and 80a.

In all there are five reflections at the movable mirror with the arrangement of Fig. 7. Accordingly, any rotational movement of that mirror results in an angular deviation of the finally reflected beam that is five times greater than would be the case for a single reflection. Figs. 6 and 8 illustrate that amplifying effect for mirror positions that differ from the zero position of Fig. 7 by only one half degree counterclockwise and clockwise respectively. It will be noted that in each instance the path of finally reflected beam 80a deviates from that of incident beam 80 by 5°, or ten times the mirror deflection. Larger angles of deflection may be handled, subject primarily to vignetting of the beam in the manner illustrated in principle in Figs. 6 and 8. It is pointed out that in spite of the relatively small transverse dimensions of fixed mirrors 90 and 100, all vignetting in Fig. 6 is caused by the edges 51 and 52 of movable mirror 50, the former limiting the width of reflected beam 84a and the latter limiting the area of incident beam 85. In Fig. 8 edge 51 of the movable mirror limits the width of incident beam 80, while edge 52 would limit reflected beam 86a were it not for the slightly greater limitation imposed by edge 102 of mirror 100 upon the finally reflected beam 80a.

In the particular illustrated arrangement the relative orientations of the mirrors may be defined by reference to the plane of the incident beam (defined by beam 80 and suspension axis 40). As seen in Fig. 7 (for example), mirror 90 forms an angle of 15° with that plane, and mirror 100 an angle of 45°, the angle between the two mirror surfaces being 120°. The zero position of movable mirror 50 corresponds to an angle of incidence of beam 80 of 60° (neglecting any obliqueness of the incident beam with respect to the plane of Fig. 7). The three mirrors are all parallel in the direction of suspension axis 40, and are preferably relatively elongated in that direction. Mirrors 90 and 100 subtend approximately equal angles at axis 40 in the plane of Fig. 7 (for example), both of those angles lying on the same side of incident beam 80. The two fixed mirrors lie on opposite sides of, and substantially adjacent, a transverse plane normal to the incident beam and longitudinally bisecting movable mirror 50. The latter plane is indicated in Fig. 7 by the line 56.

A preferred type of mounting bracket, shown in section at 110 in Fig. 7, is relatively elongated in a direction normal to the plane of the figure and may be milled from bar stock of rectangular section, or produced, for example, as an extrusion. One flat face 111 of the bracket is adapted to be secured as by an adhesive against a flat supporting face 28 of frame 20. A longitudinal bracket edge preferably engages an abutment on the frame, shown as ledge 29, whereby the bracket is located in all respects except its vertical position, which is non-critical. The opposite face of bracket 110 is provided with two elongated flat mirror supporting surfaces 112 and 114 which are parallel to face 111 longitudinally of the bracket and lie at predetermined angles to that face transversely of the bracket. In the particular modification illustrated, the bracket supporting surfaces 28 and 111 are parallel to the plane of the incident beam (already defined). Mirror receiving surfaces 112 and 114 are therefore formed at angles of 15° and 45°, respectively, with surface 111 of the bracket. Each of the surfaces 112 and 114 has a mirror locating ledge 113, 115 along one longitudinal edge while the opposite edge is unobstructed to facilitate positioning of mirrors 90 and 100, which may be cemented in place. With the help of such a bracket, the two fixed mirrors 90 and 100 can in practice be mounted very conveniently with all necessary accuracy.

An important advantage of the particular mirror arrangement of Figs. 6-8 is the facility with which the effective amplification factor of the optical system may be varied. A considerable variety of detailed light beam paths may be obtained, each having a definite amplification factor, merely by utilizing a different orientation of mirror 50 as zero position. As an illustration of such positions, Fig. 9 shows movable mirror 50 at an angle of 60° with the plane of the incident beam, the positions of mirrors 90 and 100 being as already described for Figs. 6–8. With that arrangement, incident beam 80 is reflected by mirror 50 along 88, by mirror 100 along 89, by mirror 50 along 89a, by mirror 100 along 88a, and by mirror 50 along 80a as the finally reflected beam, the several incident beam segments 80, 88, 89 and the corresponding reflected beam segments 80a, 88a, 89a coinciding as seen in plan. Deflection of mirror 50 from that zero position of Fig. 9 produces deviation of the finally reflected beam 80a through six times the deflection angle. That represents an amplification three times greater than is obtained with a single reflection. The detailed effect of mirror rotation on the light beam will be understood from what has been said of other modifications. Fig. 10 illustrates a further condition of adjustment of the embodiment of Figs. 6–8, for which the amplification is the same as that already described in connection with Figs. 1–5.

For clarity of illustration the light beams in Figs. 3–10 are shown as plane parallel beams, neglecting the convergence or divergence which may be present in each beam, but which is usually very slight because of the relatively great separation of light source 72 and receiving surface 70 from the rest of the system (Fig. 2). It is usual in previous galvanometer systems of the broad type here in question to obtain at the receiving surface, say at 73, a sharp image of source 72 (at least in the plane of Fig. 2) by providing a galvanometer mirror of suitable concave curvature, spherical or cylindrical. In accordance with the present invention, that may not be a convenient focusing method because the light strikes the movable mirror at an oblique angle that is in some instances quite far from 90°. For example, in the embodiment of Fig. 4 that angle of incidence (measured from the perpendicular) is shown as 45°, in Fig. 7 it is 60°, and in Fig. 9 it is 30°. The optical aberrations associated with such angles of incidence can be greatly reduced by distributing the required curvature among a plurality of the mirrors of the system. Alternatively, the focusing may be effected entirely at one mirror with a minimum of oblique aberration by applying a suitable curvature, not to the movable mirror, but to one or more of the fixed mirrors. For example, light strikes mirror 60 in Figs. 3–5 very nearly normally. If that mirror is curved spherically or cylindrically with the same radius of curvature that would ordinarily be given the suspension mirror (except for a very slight correction due to the added path length of beam segments 81, 81a), the desired focusing action is obtained. In the system of Figs. 6–8 the light beam strikes mirrors 90 and 100 at an angle of incidence of 15° (for zero position of the suspension), which is satisfactorily close to normal. The required curvature may therefore be applied to one of those mirrors, or may be divided equally or otherwise between them. Since the light is reflected twice from each of those mirrors, the focusing effect obtained by a given curvature of the suspension mirror in a conventional system is given by only half that curvature on one of the fixed mirrors (or one quarter on both). As is evident from Fig. 2, the mirror curvature required to focus light source 75 at 73 corresponds to an effective focal length that is long compared to the distance between the mirrors, shown at 50 and 60 in that figure, and therefore does not appreciably affect the light paths between mirrors. Whether the mirrors are literally plane or are slightly curved to focus the overall beam, their radii of curvature are long with respect to the distances between the mirrors.

In Fig. 9 the light beam is reflected twice by mirror 100, again at only 15° from normal incidence. Hence focusing may be accomplished by mirror 100 in Fig. 9 just as in Figs. 6–8, except for the very slight correction for difference of total light path. That latter correction is so small as to be negligible in practice for apparatus of the usual proportions. A particular advantage of the systems shown in Figs. 6–8 and in Fig. 9 is that if mirror 100 is given suitable curvature to focus the beam in one system it will do so also in the other. Those two systems are therefore in practice very conveniently interchangeable, the transformation from one to the other requiring merely a shift of the zero position of the suspension through an angle of 30°.

I claim:

1. In a measuring instrument that includes a frame and an element rotatable about an axis relative to the frame in response to variations of a quantity to be measured; optical means for indicating rotation of the element within a predetermined angular range, said optical means comprising a movable mirror fixedly mounted on the element for movement therewith with its reflective face substantially parallel to the said axis, means for defining a light beam incident rearwardly upon the mirror in a plane parallel to the axis, first and second fixed mirrors fixedly mounted on the frame facing the movable mirror and substantially parallel to the said axis and spaced therefrom just sufficiently to permit free rotation of the movable mirror, the first fixed mirror lying rearwardly of, and closely adjacent, the second fixed mirror, and forming therewith a dihedral angle of about 120°, the movable mirror, when in a definite rotational position intermediate its said angular range, forming a dihedral angle of about 30° with the said plane and forming dihedral angles of about 45° and about 15°, respectively, with the first and second fixed mirrors.

2. In a measuring instrument of the type that includes a frame and an element rotatable about an axis relative to the frame in response to variations of a quantity to be measured; optical means for indicating rotation of the element within a predetermined angular range, said optical means comprising a movable mirror fixedly mounted on the element for movement therewith with its reflecting face substantially parallel to the said axis, means for defining a light beam incident rearwardly upon the movable mirror in a direction substantially normal to the axis and forming with the normal to the mirror surface a first incidence angle greater than 45°, the light beam being then reflected from the movable mirror as a first reflected beam directed obliquely rearwardly, a first fixed mirror fixedly mounted on the frame facing obliquely forwardly and toward the movable mirror and substantially parallel with the said axis and in the path of the first reflected beam and acting to return the beam directly to the movable mirror at a second incidence angle less than the first, the light beam being then reflected from the movable mirror as a second reflected beam directed obliquely forwardly, a second fixed mirror fixedly mounted on the frame forwardly of the first fixed mirror and facing obliquely rearwardly and toward the movable mirror and in the path of the second reflected beam and acting to return the beam directly to the movable mirror at a third incidence angle less than the second, the reflecting surfaces of the said mirrors being approximately plane, said fixed mirrors being spaced radially from the axis just sufficiently to permit free rotation of the movable mirror and being closely spaced circumferentially of the axis in mutually oblique relation, there being a definite rotational position of the movable mirror within its said angular range for which the third incidence angle is substantially zero, whereby the beam is then reflected from the movable mirror in an axial plane normal thereto and then repeats the previously said reflections in reverse order, the finally reflected beam leaving the movable mirror in the plane through the incident beam parallel to the axis, and means for indicating deviations of the finally reflected beam from the last said plane when the movable mirror departs from the said definite rotational position.

3. Optical means as defined in claim 2 and in which the second fixed mirror is curved concavely with a radius of curvature that is long compared to the distances between the mirrors, and the movable mirror and the first fixed mirror are both plane.

WILLIAM W. MILLER.

References Cited in the file of this patent

UNITED STATES PATENTS

| Number | Name | Date |
| --- | --- | --- |
| 1,736,682 | Tuckerman | Nov. 19, 1929 |
| 2,224,281 | Webber | Dec. 10, 1940 |
| 2,478,762 | Johnson | Aug. 9, 1949 |

FOREIGN PATENTS

| Number | Country | Date |
| --- | --- | --- |
| 247,930 | Great Britain | Dec. 16, 1926 |
| 627,529 | Germany | Mar. 17, 1936 |
| 553,983 | Great Britain | June 15, 1943 |

OTHER REFERENCES

White, "Long Optical Paths of Large Aperture," article in Journal of the Optical Society of America, vol. 32, No. 2 (May 1942), pgs. 285–288. (Copy in Division 7.)